United States Patent
Fu et al.

(10) Patent No.: US 12,089,141 B2
(45) Date of Patent: Sep. 10, 2024

(54) METHOD FOR QUICKLY SEARCHING FOR HIGH-RAT NETWORK, AND TERMINAL DEVICE

(71) Applicant: Huawei Technologies Co., Ltd., Shenzhen (CN)

(72) Inventors: Lei Fu, Shenzhen (CN); Hsingyu Lung, Shanghai (CN); Tianyi Hou, Shenzhen (CN); Hao Song, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 528 days.

(21) Appl. No.: 17/290,680

(22) PCT Filed: Oct. 23, 2019

(86) PCT No.: PCT/CN2019/112712
§ 371 (c)(1),
(2) Date: Apr. 30, 2021

(87) PCT Pub. No.: WO2020/088320
PCT Pub. Date: May 7, 2020

(65) Prior Publication Data
US 2022/0015017 A1    Jan. 13, 2022

(30) Foreign Application Priority Data

Nov. 1, 2018 (CN) .......................... 201811294434.1
Nov. 12, 2018 (CN) .......................... 201811338441.7

(51) Int. Cl.
H04W 48/18 (2009.01)
H04W 48/16 (2009.01)
H04W 84/12 (2009.01)

(52) U.S. Cl.
CPC ........... *H04W 48/16* (2013.01); *H04W 48/18* (2013.01); *H04W 84/12* (2013.01)

(58) Field of Classification Search
CPC ..... H04W 48/16; H04W 48/18; H04W 84/12; H04W 88/06
See application file for complete search history.

(56) References Cited

U.S. PATENT DOCUMENTS

| 5,839,069 | A | * | 11/1998 | Keshavachar | ........ H04W 48/16 455/433 |
| 8,270,981 | B2 | | 9/2012 | Cho et al. | |
| 9,125,146 | B1 | * | 9/2015 | Edara | .................... H04W 48/18 |
| 9,226,235 | B2 | | 12/2015 | Murgan et al. | |
| 9,374,769 | B2 | * | 6/2016 | Kherani | ................ H04W 48/16 |

(Continued)

FOREIGN PATENT DOCUMENTS

| CN | 101325769 A | 12/2008 |
| CN | 103179647 A | 6/2013 |

(Continued)

*Primary Examiner* — Julio R Perez
(74) *Attorney, Agent, or Firm* — Conley Rose, P.C.

(57) ABSTRACT

A method for triggering a search for a high-RAT network includes when it is detected that a WI-FI of a terminal device is disconnected, a terminal device moves out of an elevator, or a terminal device moves to another location with a better signal, the terminal device is triggered to start background searching for a network, and attempt to camp on and register with the high-RAT network.

20 Claims, 11 Drawing Sheets

(56) References Cited

U.S. PATENT DOCUMENTS

| | | | |
|---|---|---|---|
| 11,089,534 B2* | 8/2021 | Jun | H04W 40/20 |
| 2004/0248578 A1 | 12/2004 | Korpela et al. | |
| 2009/0017818 A1 | 1/2009 | Seo | |
| 2010/0267383 A1 | 10/2010 | Konstantinou et al. | |
| 2014/0022932 A1 | 1/2014 | Park et al. | |
| 2015/0024677 A1 | 1/2015 | Gopal et al. | |
| 2015/0181530 A1 | 6/2015 | Lee et al. | |
| 2016/0073305 A1 | 3/2016 | Yang et al. | |
| 2016/0088677 A1 | 3/2016 | Sridharan | |
| 2016/0135205 A1* | 5/2016 | Barbu | H04W 48/20 370/338 |
| 2018/0242229 A1* | 8/2018 | Ahluwalia | H04W 8/205 |
| 2019/0020383 A1* | 1/2019 | Chritz | H04B 7/04 |
| 2019/0320219 A1* | 10/2019 | Yoden | H04W 8/005 |
| 2019/0353912 A1* | 11/2019 | Chen | G02B 27/0944 |
| 2020/0120739 A1 | 4/2020 | Qiu et al. | |
| 2022/0015017 A1* | 1/2022 | Fu | H04W 48/18 |
| 2023/0111636 A1* | 4/2023 | Liu | H04W 72/56 370/329 |
| 2023/0376476 A1* | 11/2023 | Bhola | G06F 16/2246 |

FOREIGN PATENT DOCUMENTS

| | | |
|---|---|---|
| CN | 103200651 A | 7/2013 |
| CN | 103260205 A | 8/2013 |
| CN | 103648148 A | 3/2014 |
| CN | 103747469 A | 4/2014 |
| CN | 101346002 B | 7/2014 |
| CN | 103906189 A | 7/2014 |
| CN | 103906195 A | 7/2014 |
| CN | 105848253 A | 8/2016 |
| CN | 105898825 A | 8/2016 |
| CN | 105939525 A | 9/2016 |
| CN | 106102130 A | 11/2016 |
| CN | 106375962 A | 2/2017 |
| CN | 106804057 A | 6/2017 |
| CN | 107094312 A | 8/2017 |
| CN | 107148059 A | 9/2017 |
| CN | 107396410 A | 11/2017 |
| CN | 107454639 A | 12/2017 |
| CN | 108200632 A | 6/2018 |
| CN | 108271225 A | 7/2018 |
| EP | 2498549 B1 | 7/2018 |
| WO | 2004066077 A2 | 8/2004 |

\* cited by examiner

METHOD FOR QUICKLY SEARCHING FOR HIGH-RAT NETWORK, AND TERMINAL DEVICE

CROSS-REFERENCE TO RELATED APPLICATIONS

This application is a U.S. National Stage of International Patent Application No. PCT/CN2019/112712 filed on Oct. 23, 2019, which claims priority to Chinese Patent Application No. 201811338441.7 filed on Nov. 12, 2018 and Chinese Patent Application No. 201811294434.1 filed on Nov. 1, 2018. All of the aforementioned applications are hereby incorporated by reference in their entireties.

TECHNICAL FIELD

Embodiments of this application relate to the communications field, and in particular, to a method for quickly searching for a high-RAT network, and a terminal device.

BACKGROUND

With popularization of a 4G network, users have an increasingly intense requirement for a data access speed. Due to a great difference between 4G, 3G, and 2G network architectures, in most scenarios, a data service connection speed and network access speed of 4G are higher than those of 3G, which are higher than those of 2G. Therefore, when accessing a network by using mobile data, most common users require that terminal devices camp on a higher network RAT, to meet a higher access speed.

Currently, in the 3GPP (3rd Generation Partnership Project, 3rd generation partnership project) protocol, there are three means of switching between RATs: hand over (handover, connected mode), redirection (redirection, connected mode), and reselection (reselection, idle mode). Based on an actual network configuration status, in some areas with a high RAT (4G/3G), UE remains in a low-RAT network for a long time because a network configuration is improper or switching is not triggered. For this problem, vendors, such as Qualcomm, have respective related solutions.

However, most UEs cannot determine whether the terminal device is in a moving state and whether a neighboring network has coverage of a high-RAT network. For such UE, a periodic search mode is designed, that is, a round of searching for a 4G/3G network is autonomously initiated when a specific timer expires. This mode cannot be effectively combined with actual user experience. For example, if a user does not move, blind searching may waste power; when the user actually moves to an area with 4G/3G coverage, searching is not performed in a timely manner because a timer has not expired.

SUMMARY

Therefore, this application attempts to combine a characteristic of an intelligent terminal system with a user experience scenario, to initiate searching for a high-RAT network when a user "has a need", thereby meeting a tradeoff between user experience and power consumption as far as possible.

According to a first aspect, a method is provided, including: A terminal device connects to a first hotspot, performs a data service by using the first hotspot, and when the terminal device is disconnected from the first hotspot, starts searching for a high-priority network, where the terminal device stores a high-priority network list, and searching is performed in descending order of priorities in the high-priority network list. In this way, the terminal device can trigger a search for a high-priority network more quickly.

According to a first possible implementation of the first aspect, that the terminal device is disconnected from the first hotspot specifically includes: The terminal device leaves an area covered by a signal of the first hotspot, or a signal strength of the first hotspot is less than a threshold. In this way, the terminal device can trigger a search for a high-priority network more quickly in a plurality of scenarios.

According to a second possible implementation of the first aspect, the terminal device is connected to the first hotspot by using Wi-Fi.

According to a third possible implementation of the first aspect, when the terminal device is disconnected from the first hotspot, the terminal device does not start searching for a high-priority network, where the terminal device stores a search record of searching for the high-priority network by the terminal device when the terminal device is disconnected from the first hotspot, and the search record identifies that when the terminal device is disconnected from the first hotspot, the terminal device does not camp on the high-priority network or a signal strength of the high-priority network is less than a threshold. According to the method, a search failure probability can be reduced based on the search record.

According to a fourth possible implementation of the first aspect, the connecting, by a terminal device, to a first hotspot, and performing a data service by using the first hotspot specifically includes: The terminal device connects to the first hotspot, and performs the data service by using the first hotspot, where the terminal device is at a first location. The starting, by the terminal device when the terminal device is disconnected from the first hotspot, searching for a high-priority network specifically includes: When the terminal device is disconnected from the first hotspot, the terminal device starts searching for a high-priority network, where the terminal device is at a second location. The first location is an area that can be covered by a signal of the first hotspot. The second location is an area that cannot be covered by the signal of the first hotspot or an area in which a signal strength of the first hotspot is less than a threshold. According to the method, the terminal device can switch between hotspot connections based on a signal-covered area.

According to any one of the implementations of the first aspect, the high-priority network is a highest-RAT network supported by the terminal device or a preset highest-RAT network, and the high-priority network is a 4G or 5G network. The high-priority network is a highest-RAT network supported by the terminal device or a preset highest-RAT network. The terminal device stores network parameters of the first hotspot and network parameters of the second hotspot. The network parameter signal includes a strength, signal quality, a registration success rate, and a packet loss rate. The terminal device records first-hotspot information and second-hotspot information of the first location. The recording specifically includes recording SSIDs, BSSIDs, signal strengths, signal quality, registration success rates, and encryption and authentication manners of the first hotspot and the second hotspot. The terminal device sets the first hotspot as a high-priority network based on the first-hotspot information and the first-hotspot information. In this way, a high-priority network can be set.

According to a second aspect, a method is provided, including: A terminal device determines and learns an elevator mode, that is, a behavior of the terminal device entering or leaving an elevator. After identifying the elevator mode, when detecting that the terminal device moves out of the elevator, the terminal device sends the state to a modem. The modem determines that the terminal device is not currently in a highest-RAT network, and triggers searching for a high-priority network. In this way, the terminal device can be quickly connected to a high-priority network when leaving the elevator.

According to a third aspect, a terminal device is provided, including: a touchscreen, where the touchscreen includes a touch-sensitive surface and a display; one or more processors; a memory; a plurality of application programs; and one or more computer programs. The one or more computer programs are stored in the memory. The one or more computer programs include an instruction. When the instruction is executed by the terminal device, the terminal device is enabled to perform the following step: when the terminal device is disconnected from a first hotspot, starting searching for a high-priority network, where the terminal device stores a high-priority network list, and searching is performed in descending order of priorities in the high-priority network list.

According to a first possible implementation of the third aspect, the instruction that the terminal device is disconnected from a first hotspot specifically includes: The terminal device leaves an area covered by a signal of the first hotspot, or a signal strength of the first hotspot is less than a threshold.

According to a second possible implementation of the third aspect, the instruction further includes: determining the high-priority network, where the high-priority network is associated with a second hotspot; and connecting, by the terminal device, to the second hotspot, and camping on the high-priority network.

According to a third possible implementation of the third aspect, the instruction further includes: when the terminal device is disconnected from the first hotspot, not starting searching for a high-priority network, where the terminal device stores a search record of searching for the high-priority network by the terminal device when the terminal device is disconnected from the first hotspot, and the search record identifies that when the terminal device is disconnected from the first hotspot, the terminal device does not camp on the high-priority network or a signal strength of the high-priority network is less than a threshold.

According to a fourth aspect, a computer readable storage medium is provided, including an instruction. When the instruction is executed on an electronic device, the electronic device is enabled to perform the following step: when the terminal device leaves an area covered by a signal of a first hotspot, or a signal strength of a first hotspot is less than a threshold, starting searching for a high-priority network, where the terminal device stores a high-priority network list, and searching is performed in descending order of priorities in the high-priority network list. The terminal device is connected to the first hotspot by using Wi-Fi. The high-priority network is a highest-RAT network supported by the terminal device or a preset highest-RAT network.

It should be noted that embodiments of this application may be randomly combined to achieve different technical effects.

DESCRIPTION OF EMBODIMENTS

Figure 1:
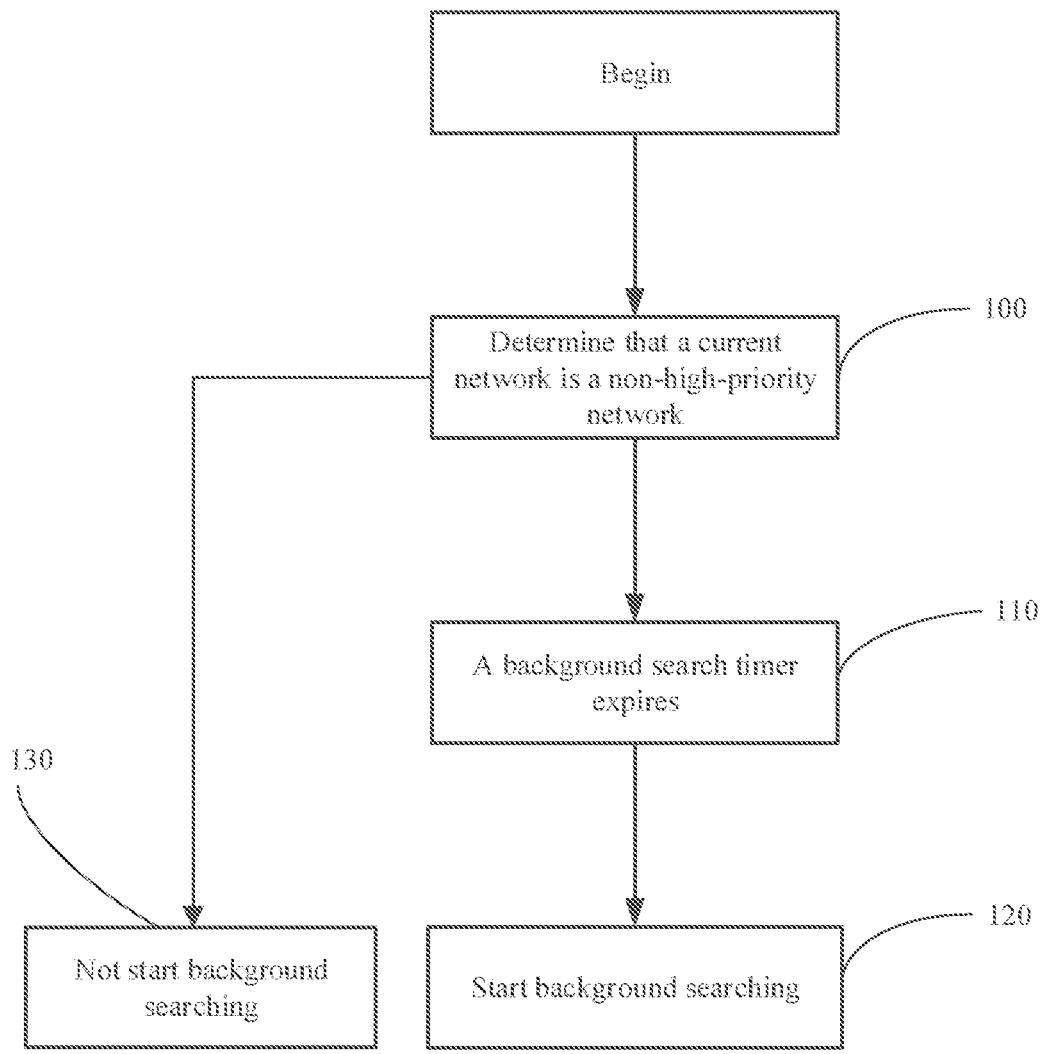
FIG. 1 is a first schematic diagram of triggering searching for a high-priority network according to an embodiment of this application.

After a terminal device is switched on or powered on, or performs cell reselection, the terminal device first searches for an available public land mobile network (Public Land Mobile Network, PLMN). After finding the available PLMN network, the terminal device can obtain a corresponding cell service, and camp on a cell.

In some embodiments, a terminal device prestores a PLMN list, and in the list, a plurality of PLMN networks are arranged in order of priorities, as shown in the following table. A PLMN 1, a PLMN 2, and a PLMN 3 may be operator names, for example. Sprint and T-mobile.

| Sequence number | PLMN   | Priority         |
|-----------------|--------|------------------|
| 1               | PLMN 1 | 1 (high)         |
| 2               | PLMN 2 | 2 (intermediate) |
| 3               | PLMN 3 | 3 (low)          |

During network registration, the terminal device may search for a network based on the priorities in the PLMN list, and attempt to camp on a high-priority network.

If the terminal device has accessed a VPLMN (Visited PLMN, visited PLMN), but the VPLMN is not a PLMN with a highest priority under a same country code, the UE needs to periodically initiate searching for a PLMN, to find a better PLMN for camping. For example, the terminal device is registered with the network operator Sprint, but can find only a network of T-Mobile in a current cell. Although a country code is the same, the mobile network cannot provide a service that can be used by the terminal. Therefore, the terminal device needs to periodically perform searching to find whether there is a China Unicom network, so as to be handed over back to an HPLMN (Home PLMN, home PLMN) as soon as possible to enjoy a service provided by China Unicom. For another example, when the terminal device moves to a location B from a location A, and the location B supports signal coverage of a network of a higher RAT (for example, 5G), the terminal device triggers searching for a high-priority network, and attempts to camp on the 5G network. This may be understood as that the location A and the location B are different cells.

In some embodiments, a terminal device camps on a VPLMN, and starts an HPLMN timer to return to an HPLMN or a high-priority PLMN as soon as possible. After the HPLMN timer expires, the terminal device attempts to search for a high-priority network.

In addition, searching for a high-priority network is mostly used by the terminal device to return to a high-priority network mode. If an access mode of an HPLMN high-priority network is preferentially enabled by using an NVM (Non-volatile memory, NVM for short), and the terminal device currently does not camp on a high-priority network access mode, even if the terminal device currently camps on an HPLMN, searching for a high-priority network is still initiated. This is mainly for a case in which the terminal device is in a 2G/3G network and no neighboring cell is configured for the network. In this case, the terminal device can still return to LTE (Long Term Evolution, long term evolution) by performing background searching, instead of merely relying on reselection.

In some embodiments, a terminal device may extend to searching for networks of other access points, for example, Wi-Fi, Bluetooth, and NR.

It may be understood that "searching for a high-priority network" is merely a term used in the embodiments of this application. A meaning represented by the term is described in the embodiments of this application, and a name of the term does not constitute any limitation on the embodiments of this application. During specific implementation, "searching for a high-priority network" may be implemented by using various network search functions provided by existing mobile phone manufacturers, for example, background search (Background research, "background search" for short) functions of Qualcomm and Huawei. In some embodiments of this application, "searching for a high-priority network" may also be referred to as "searching for a network", "a search for a high-priority network", "background searching", "a background search", "background searching for a network", and "network searching".

FIG. 1 is a first schematic diagram of searching for a high-priority network according to a possible implementation of this application.

As shown in FIG. 1, an embodiment of this application provides a method for searching for a high-priority network by a terminal device. In a possible design, the high-priority network is a highest-RAT network supported by the terminal device, for example, a 5G network. In a possible design, the high-priority network may be alternatively set by a user. For example, the terminal device can support a 5G network, but in consideration of traffic and the like, the user sets the terminal device to preferentially connects to a 4G network at present. In this case, the high-priority network is a 4G network. Specific steps are as follows.

Step 100: The terminal device determines whether a network on which the terminal device camps is a high-priority network, and performs a next step (step 110) if the network is not a high-priority network, or may not start background searching (step 130) if determining that the current network is a high-priority network.

In some embodiments, when an RAT of a network on which the terminal device camps changes, the terminal device determines whether the terminal device is in a high-priority network. For example, when the terminal device is handed over from a 4G network to a 3G network, the terminal device may obtain a current network RAT or type, for example, an Android device may use a function int getNetworkType( ), where the function can be used to indicate the current network type of the terminal device, and NETWORK_TYPE_LTE indicates a 4G network. In this way, the terminal device determines whether a network on which the terminal device camps is a high-priority network. In some embodiments, the terminal device may alternatively detect, in real time, whether the terminal device is in a non-high-priority network.

In some other embodiments, the terminal device may set a maximum quantity (for example, 3) of searches for a high-priority network. After the maximum quantity of background searches is reached, the terminal device may pause searching (for example, may wait for 1 minute before starting searching), or may stop searching (that is, stop searching for a high-priority network), or may suspend searching for a high-priority network (suspend searching for a high-priority network, and after a specific condition is met, may restart searching). When determining that the maximum quantity of searches for a high-priority network is not reached, the terminal device proceeds to the next step (step 110). When a quantity of background searches reaches the maximum quantity of background searches, the terminal device does not start background searching.

Step 110: The terminal device starts a high-priority network search timer, and after the high-priority network search timer expires, the terminal device enables a background search function (120). In some embodiments, the high-priority network search timer may have different settings. For example, duration of the high-priority network search timer for the first time is 3 minutes, and the first search for a high-priority network lasts for 3 minutes; duration of the high-priority network search timer for the second time is 5 minutes, and the second search for a high-priority network lasts for 5 minutes.

Step 120: The terminal device starts searching for a high-priority network, where background search duration may be set, for example, to 3 seconds.

In some embodiments, after the high-priority network search timer (which may also be referred to as a "background search timer" or "background searching timer") expires, the terminal device determines whether the terminal device is currently in an idle state. If the terminal device is in the idle state, the terminal device starts searching for a high-priority network. If the device is not currently in the idle state, until the terminal device enters the idle state, the terminal device does not start searching for a high-priority network. This prevents the terminal device from searching for a high-priority network in the idle state. Therefore, power consumption is reduced.

In some embodiments, trigger duration may be configured by using an NVM (Non-volatile memory, NVM for short). For example, first-time trigger duration is 3 minutes. In a possible design, the background search timer may periodically trigger background searching for a network, thereby reducing power consumption.

Figure 2:
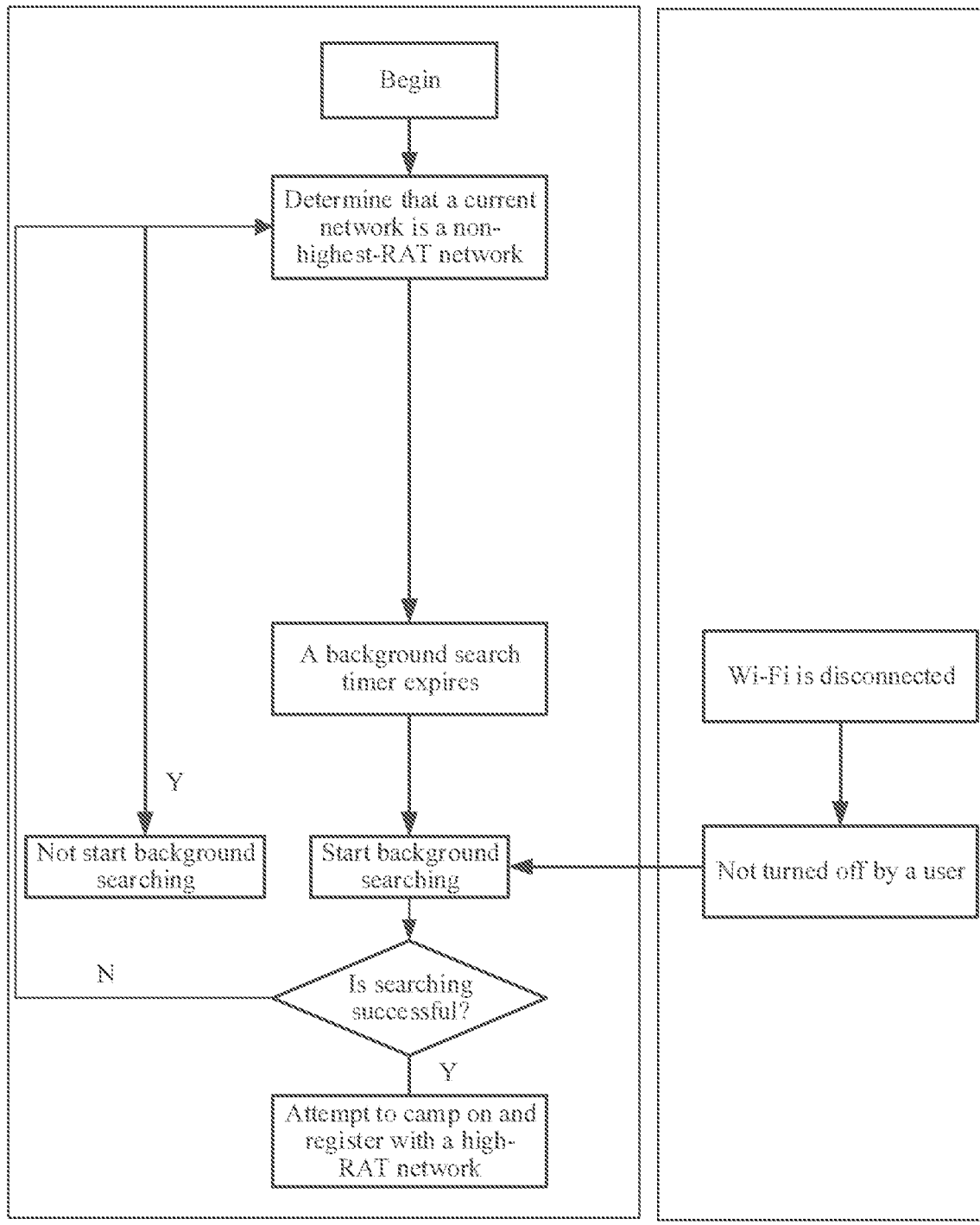
FIG. 2 is a second schematic diagram of triggering searching for a high-priority network according to another embodiment of this application.

FIG. 2 is a second schematic diagram of background searching according to another embodiment of this application.

As shown in FIG. 2, in some embodiments, background searching for a high-priority network may be alternatively triggered by determining that Wi-Fi is in a disconnected state. In some embodiments, the Wi-Fi disconnected state may not be caused by a user operation (turning off a Wi-Fi switch), for example, may be caused by a network fault or leaving an effective range of signal coverage of a current Wi-Fi access point.

In some embodiments, searching for a high-priority network may be alternatively triggered when a terminal device is connected to a network of poor quality, for example, a signal strength, signal quality, or a packet loss rate is less than a threshold.

When detecting that Wi-Fi is in the disconnected state, a terminal device may directly start searching for a high-priority network, that is, a trigger condition of searching for a high-priority network may not depend on a background search timer. In some embodiments, if a high-priority network is found, the terminal device attempts to camp on and register with the high-priority network; if no high-priority network is found, the background search timer may still be used as the background search trigger condition.

In some embodiments, when Wi-Fi is disconnected, if the background search timer expires, or a maximum quantity of background searches is reached, or a non-first background search times out, that is, background searching has been performed, background searching is not re-triggered in this case.

In some embodiments, when Wi-Fi is disconnected, if the terminal device triggers background searching, but at this moment, the background search timer expires, or a maximum quantity of background searches is reached, or a non-first background search times out, that is, background searching has been performed, background searching is not re-triggered in this case.

In some embodiments, when Wi-Fi is disconnected, if the terminal device triggers background searching, the background search timer may pause or stop timing.

In some embodiments, when Wi-Fi is disconnected, if the terminal device triggers background searching, the background search timer may still perform timing.

In some embodiments, after background searching is started, where the background search trigger condition may be that Wi-Fi is disconnected or the timer expires, if no high-priority network is found, triggering may still be performed by using the background search timer.

According to this embodiment, when a user leaves a Wi-Fi hotspot coverage area, a probability of camping on a high-priority network can be increased, and a time for returning to a high-RAT network can be shortened, so that better network access experience can be obtained.

In consideration of user experience, a requirement for a high-priority network is not intense when Wi-Fi is connected; when Wi-Fi is disconnected, mobile data needs to be used for user data service sending and receiving, and therefore, a requirement for a high RAT such as 4G/3G is more intense. Therefore, when Wi-Fi is disconnected, user experience may be improved by increasing a possibility of camping on a high-RAT network, and shortening a time for returning to a high-RAT network.

In this implementation, a Wi-Fi hotspot may also be extended to hotspots of other types, for example, NR (5G access network), an LTE base station, and Bluetooth.

Figure 3:
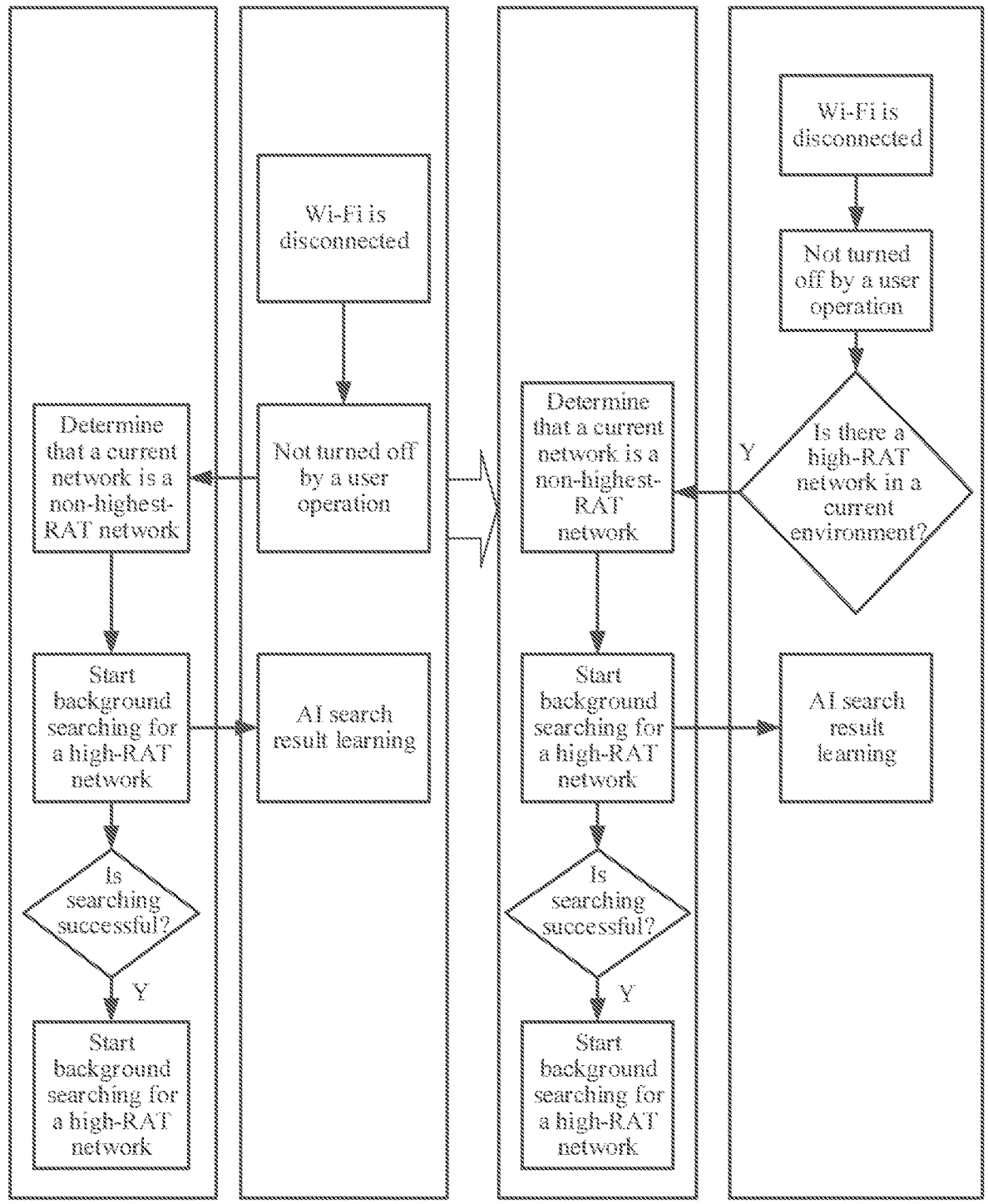
FIG. 3 is a third schematic diagram of triggering searching for a high-priority network according to a possible implementation of another embodiment of this application.

FIG. 3 is a third schematic diagram of background searching according to a possible implementation of this application.

As shown in FIG. 3, another embodiment of this application provides a manner of learning with a combination of a Wi-Fi module, an AI (Artificial intelligence, artificial intelligence) module, and a modem module to determine a success probability of searching for a high-RAT network after Wi-Fi is disconnected, so as to optimize searching for a high-priority network.

In a possible design, each time a different Wi-Fi hotspot is disconnected, a terminal device searches for a high-priority network, and records and learns a network search result. For example, the AI module may be used for recording the search result, for example, as shown in Table 1.

The terminal device may record a quantity of successful network searches, a quantity of failed network searches, and a network search success probability after background searching is triggered each time.

| SSID | Quantity of successful background searches | Quantity of failed background searches | Total quantity of background searches | Success probability |
|---|---|---|---|---|
| Wi-Fi-1 | 10 | 0 | 10 | 100% |
| Wi-Fi-2 | 5 | 5 | 10 | 50% |
| Wi-Fi-3 | 1 | 0 | 1 | 100% |
| Wi-Fi-4 | 0 | 10 | 10 | 0% |

In some embodiments, the terminal device may determine, based on a historical result of searching for a high-priority network, whether to start searching for a high-priority network. After performing recording or learning for a plurality of times, the terminal device may determine, based on currently disconnected Wi-Fi, whether a high-RAT network can be found. For example, the terminal device is currently connected to Wi-Fi-4 and performs a data interaction service. When the terminal is disconnected from Wi-Fi-3, the terminal device starts searching for a high-priority network, as described in FIG. 2. However, the terminal device finds, based on a historical search record, that a success rate of starting background searching after Wi-Fi-4 is disconnected is 0. In this case, background searching may not be started.

In some embodiments, if it is determined, based on a historical record, that no high-RAT network is found, the terminal device may not trigger background searching, for example, for Wi-Fi-4.

In some embodiments, whether to initiate background searching, for example, for Wi-Fi-1 or Wi-Fi-2, is determined based on a probability, in a historical record, of successfully finding a high-RAT network.

In some embodiments, whether to initiate background searching is determined based on a background network search probability and a total quantity of searches. For example, for Wi-Fi 3, although a network search success probability is 100%, a total quantity of network searches is only 1. In this case, learning continues, and network searching may not be initiated.

| Wi-Fi | Quantity of successful searches | Quantity of failed searches | Total quantity of searches | Success probability | Whether to initiate background searching |
|---|---|---|---|---|---|
| Wi-Fi-1 | 10 | 0 | 10 | 100% | Yes |
| Wi-Fi-2 | 5 | 5 | 10 | 50% | Yes |
| Wi-Fi-3 | 1 | 0 | 1 | 100% | Continue learning |
| Wi-Fi-4 | 0 | 10 | 10 | 0% | No |

The foregoing record table is merely for ease of understanding. In a possible design, the record table may be alternatively in a form of a packet, information, data, or the like.

When the terminal device leaves a Wi-Fi coverage area, a probability of camping on a high-RAT network can be increased, and a time for returning to a high-RAT network can be shortened, so that better network access experience can be obtained. Considering that habitual use locations of most users are comparatively concentrated, a success rate of searching for a high-RAT network can be effectively increased through machine learning. If there is no high-RAT network in an actual environment, a waste of power caused by unnecessary searching is also avoided.

Figure 4:
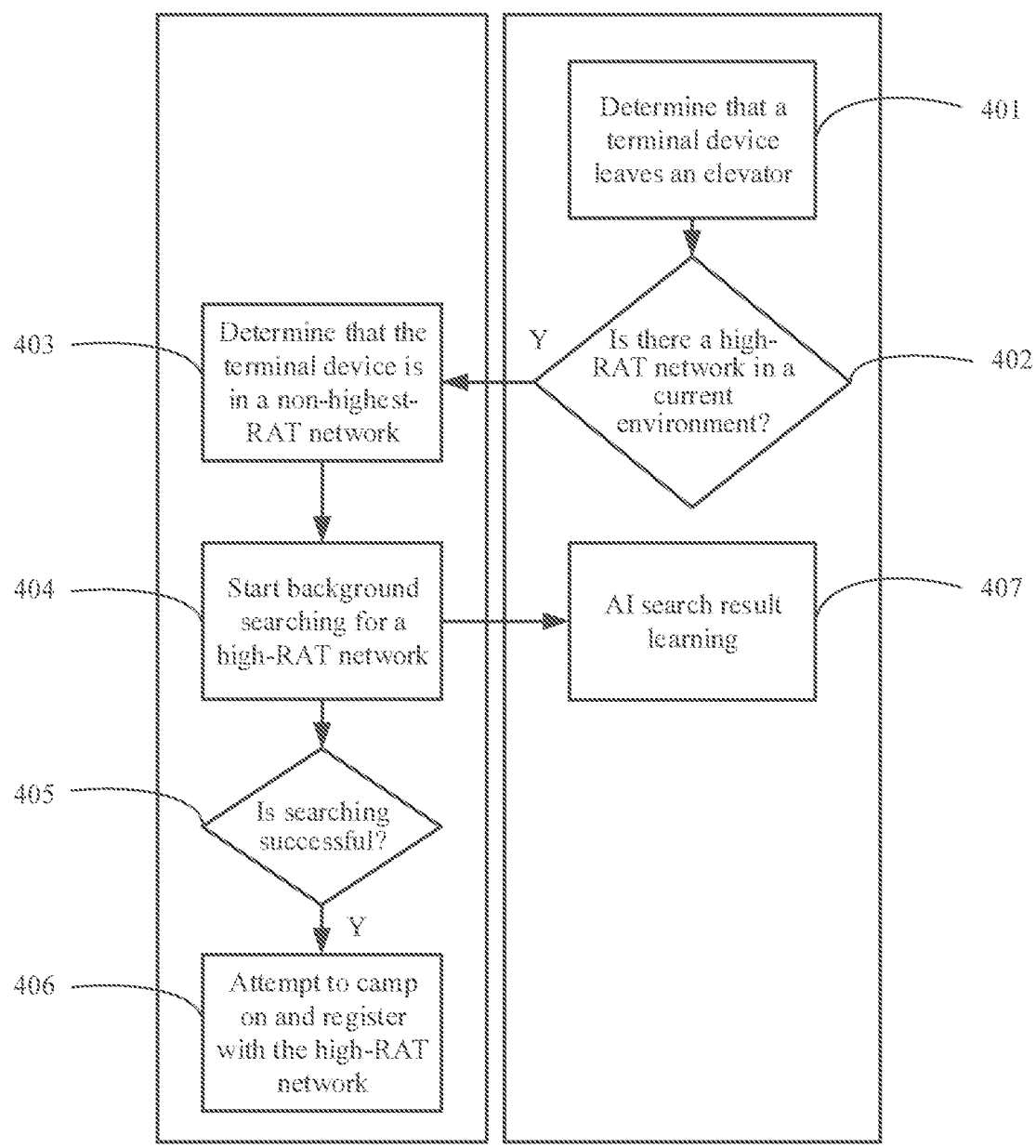
FIG. 4 is a fourth schematic diagram of triggering searching for a high-priority network according to some other embodiments of this application.

FIG. 4 is a fourth schematic diagram of background searching according to a possible implementation of this application.

A method for determining, by using a sensor, behaviors of a terminal entering and leaving an elevator, and triggering background searching for a high-priority network is provided. In some embodiments, the sensor may include a barometer, an accelerometer, and the like.

FIG. 4 shows the following steps.

Step 401: A terminal device determines an elevator mode, that is, determines behaviors of the terminal device entering and leaving an elevator.

For example, a walking state is identified by using an accelerometer; a weightless state and an overweight state in the elevator are identified by means of, for example, detecting acceleration and deceleration by using the accelerometer, and detecting a change in atmospheric pressure by using a barometer; and the walking state is compared with the overweight or weightless state, so as to identify a behavior of entering the elevator and a behavior of leaving the elevator. The elevator mode can be accurately identified after a plurality of times of learning.

After identifying the elevator mode, when detecting that the terminal device moves out of the elevator, the terminal device sends the state to a modem or an AP.

Step 403: The modem or the AP determines that a network on which the terminal device camps is a non-high-priority network, and triggers searching for a high-priority network.

Step 404: The terminal device starts searching for a high-priority network. Specifically, the terminal device starts a high-priority network search timer, and after the high-priority network search timer expires, the terminal device enables a high-priority network search function. In some embodiments, the high-priority network search timer may have different settings. An example is as follows:

Duration of the high-priority network search tinier for the first time is 3 minutes, and the first search for a high-priority network lasts for 3 minutes; duration of the high-priority network search timer for the second time is 5 minutes, and the second search for a high-priority network lasts for 5 minutes.

In some embodiments, the modem feeds back a high-priority network search result to an AI module, and the AI module records and learns the search result for determining of a high-RAT search when leaving the elevator next time.

As shown in step 402 in the figure, in some embodiments, when it is determined that the mobile device moves out of the elevator, background searching for a high-RAT network may not be started, for example, if it is found, based on a historical record, that there is no high-RAT network in a current environment, or the terminal device is currently located in a high-RAT network.

In some embodiments, the terminal device may record a search result of each started background search for a high-priority network, as shown in steps 405 and 406.

In a possible design, when it is identified that the terminal device moves out of the elevator, and a current network is not a high-priority network, if it happens that the background search timer expires, or a maximum quantity of background searches is reached, or a non-first background search times out, that is, background searching has been performed, background searching is not re-triggered in this case.

In a possible design, when it is identified that the terminal device moves out of the elevator, and a current network is not a high-priority network, if the terminal device triggers background searching for a high-priority network, but at this moment, the background search timer expires, or a maximum quantity of background searches is reached, or a non-first background search times out, that is, background searching has been performed, background searching is not re-triggered in this case.

In a possible design, when it is identified that the terminal device moves out of the elevator, and a current network is not a high-priority network, if the terminal device triggers background searching for a high-priority network, the background search timer may pause or stop timing.

In a possible design, when it is identified that the terminal device moves out of the elevator, and a current network is not a high-priority network, if the terminal device triggers background searching for a high-priority network, the background search timer may still perform timing.

Figure 5:
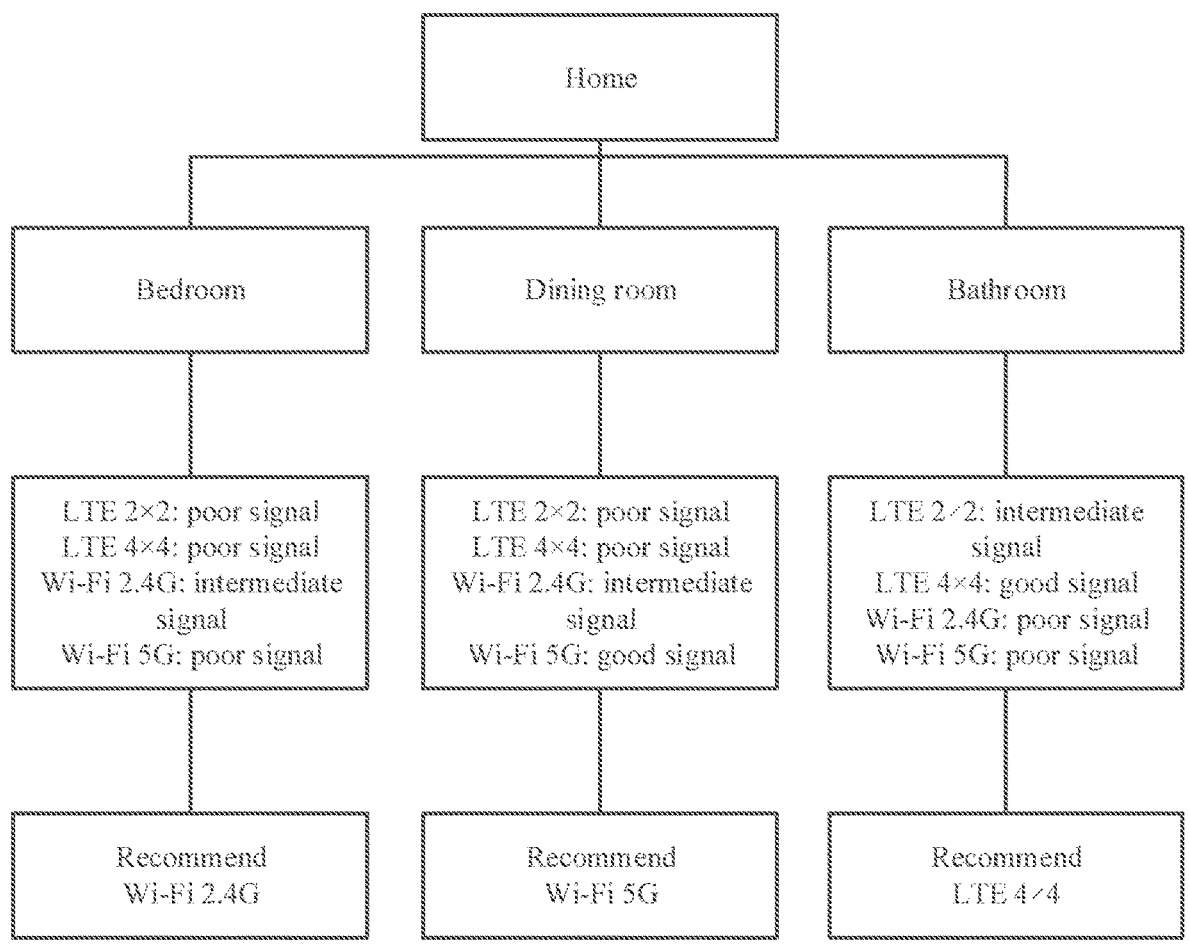
FIG. 5 is a fifth schematic diagram of triggering searching for a high-priority network according to a possible implementation of this application.

FIG. 5 is a fifth schematic diagram of background searching according to a possible implementation of this application.

As shown in FIG. 5, information about wireless access points such as Wi-Fi, LTE, NR, and Bluetooth access points may be collected at a location of a terminal. The information includes SSIDs (Service Set Identifier), BSSs (Basic Service Set), signal strengths, signal quality, registration success rates, encryption and authentication manners, and other network parameters of the access points. It should be noted that "a location" in this application may be a cell covered by a signal of an access point, may be a location covered based on a GPS (Global Positioning System) signal, may be a virtual space obtained through clustering based on recorded network status information, or may be based on a physical space, for example, a room. This is not limited in this application.

In a possible design, one location may have a plurality of wireless access points. For example, a bedroom may be covered by signals of different hotspots, including a base station, Wi-Fi, and the like.

In a possible design, the terminal device may record and learn access point information of a location, and recommend a high-priority access point thereof. For example, the high-priority access point may be set based on a specific network parameter, for example, a signal strength or signal quality. When the terminal device moves to a bedroom from a dining room, if it is detected that a recommended access point for the bedroom is Wi-Fi 2.4G, the terminal device may be automatically connected to the Wi-Fi 2.4G access point.

Figure 6:
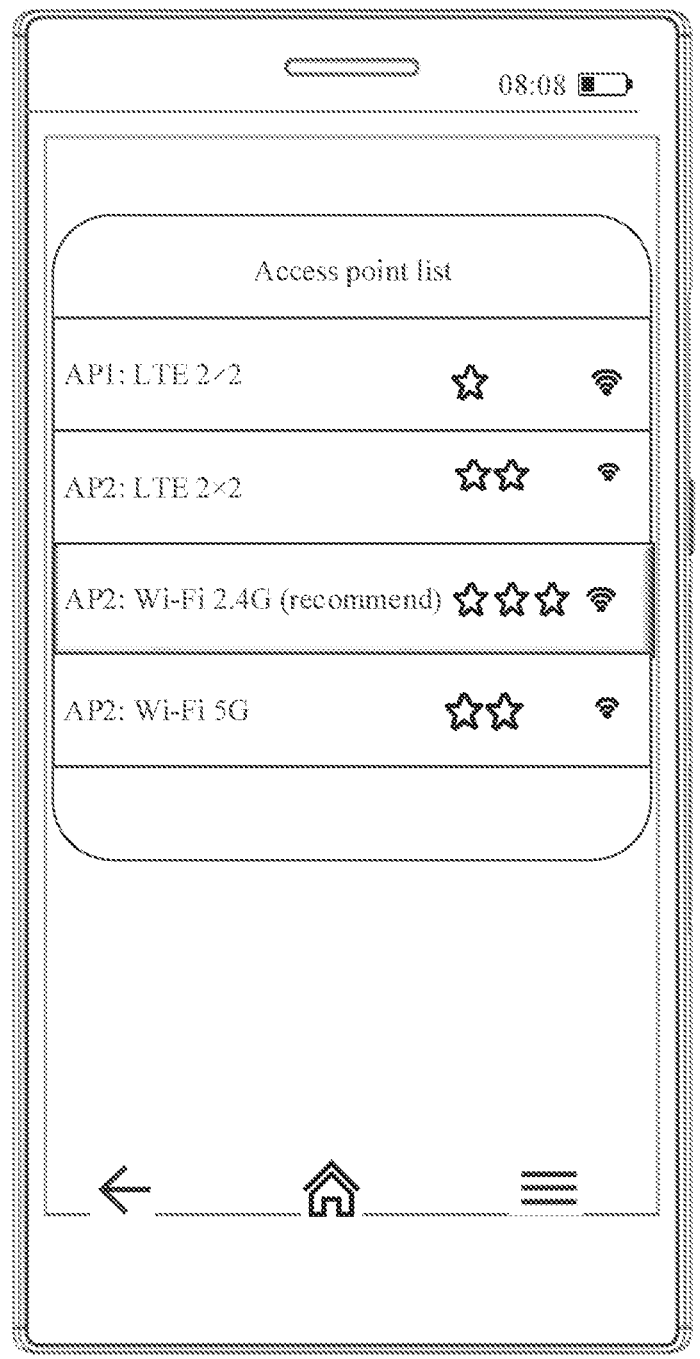
FIG. 6 shows a first user interface of a terminal device according to a possible implementation of this application.

In a possible design, as shown in FIG. 6, the terminal device may also display a pop-up box to remind a user of an access point signal coverage list.

A quantity of five-pointed stars may be used to denote network quality of an access point (that is, an identifier indicating network quality of an access point is a five-pointed star). A larger quantity of five-pointed stars indicates better quality of an access point that the terminal device registers with or is connected to. Certainly, in this embodiment of the present invention, a form of an identifier indicating network quality of an access point to which the terminal device is connected is described by using merely an example herein. In an actual application scenario, an identifier of network quality when the terminal accesses a network by using an online hotspot may be alternatively presented in another form. This is not specifically limited in this embodiment of the present invention.

A user interface may further display an identifier of a recommended access point for connection and a network type of an access point that cannot be connected.

The user interface may also display information such as an SSID, a signal strength, and signal quality of each access point, and may also display a current high-priority access point in an emphasized manner. The emphasized displaying may be implemented in a manner such as highlighting or text displaying. This is not limited in this application.

Figure 7:
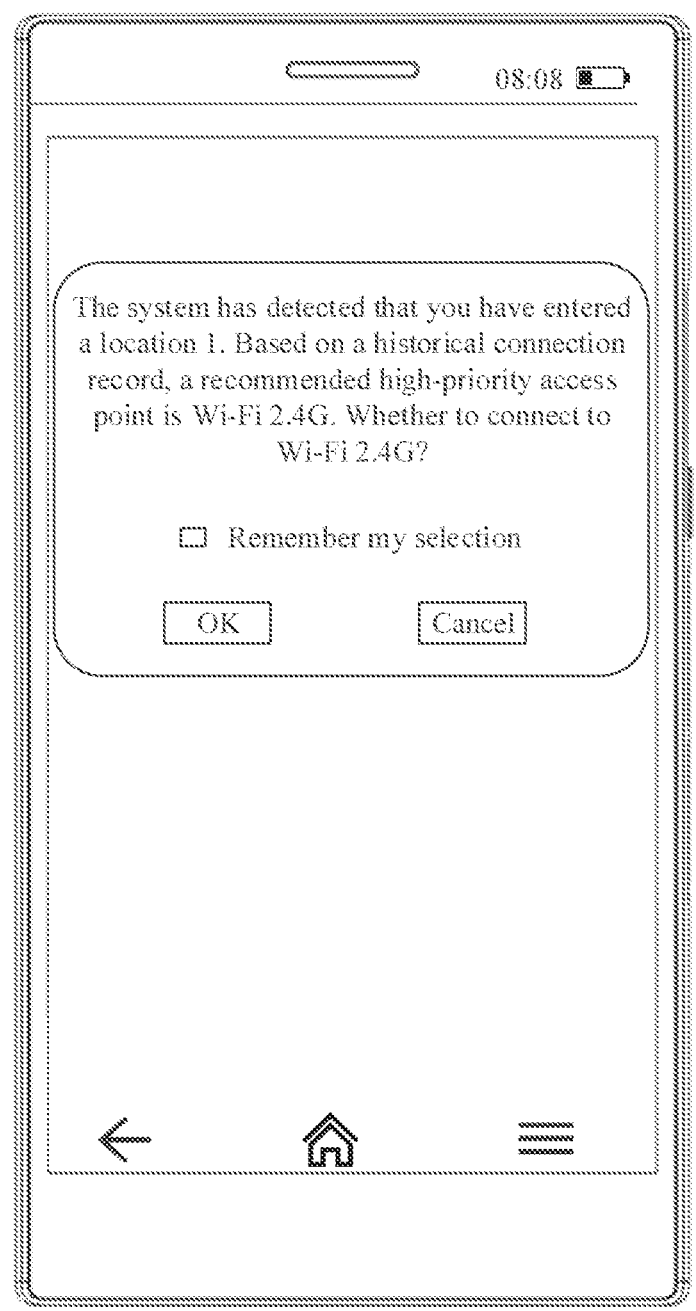
FIG. 7 shows a second user interface of a terminal device according to a possible implementation of this application.

In a possible design, as shown in FIG. 7, alternatively, a pop-up box may be used to inform a user of a high-priority access point at a current location, and request the user to confirm whether to connect to the high-priority access point. The terminal device may determine, based on a selection of the user, whether to connect to the high-priority access point.

In a possible design, a recommended high-priority access point network may be a network of an access point whose network parameter meets a preset condition, for example, a signal strength or signal quality is greater than a threshold, where the threshold may be an empirical value.

In some embodiments, signals such as a Wi-Fi signal, a 3G signal, an LTE signal, and an NR signal may be collected based on information such as a geographical location, service traffic, or camping duration of the terminal device, including signal quality, a signal strength, and an application smoothness degree. For example, camping duration of the terminal device at a location A exceeds a threshold. For another example, the terminal device requires large service traffic at a location B. It should be noted that the locations A and B herein are not limited in this application. Each of A and B may be a room, may be an open field, may be an area covered by a signal of an access point, or may be a virtual space obtained through clustering based on information about wireless access points such as Wi-Fi, LTE, NR, and Bluetooth access points.

After collecting signal coverage information of a location or space, the terminal device may establish a signal fingerprint database of the location. It may be understood that, based on such a signal fingerprint database, it can be determined that the terminal device currently moves to a location or space, and signal fingerprint database information of the current location can be obtained. This may also be understood as follows: A virtual space is obtained through clustering based on signal fingerprint database information. For example, the terminal device has collected signal fingerprint database information of a location A, and when the terminal device arrives at the location A again, the terminal device obtains signals such as a Wi-Fi signal, a 3G signal, an LTE signal, and an NR signal at the location A. The terminal device may compare signal information of any one or more access points with a signal fingerprint database, obtain a high-RAT network or a network whose signal is optimal at the location A, and attempt to camp on and register with the network.

As shown in FIG. 5, the terminal device may collect signals, including LTE and Wi-Fi signals, in a bedroom, a dining room, and a bathroom. The LTE signals include LTE 4×4 and LTE 2×2 signals, and the Wi-Fi signals include Wi-Fi 2.4G and Wi-Fi 5G signals. In a possible design, parameter information such as signal quality, a registration success probability, and a recommended signal of each room may be recorded. For example, when the mobile terminal moves to the bedroom from the dining room, the mobile terminal obtains LTE and Wi-Fi signals, for example, obtains a Wi-Fi 2.4G signal and determines that signal quality is intermediate, and further obtains a Wi-Fi 5G signal and determines that signal quality is comparatively poor. The mobile terminal compares information about the obtained Wi-Fi signals with fingerprint database information stored in the terminal device, determines that the mobile terminal enters the bedroom, and recommends Wi-Fi 2.4G to the terminal device for connection.

In some embodiments, when the terminal device moves to the dining room, the terminal device may obtain parameter information of LTE 4×4, LTE 2×2, Wi-Fi 2.4G, and Wi-Fi 5G in real time. For example, a signal strength of LTE 4×4 is 50 dB. When it is determined that the parameter information of the LTE 4×4, LTE 2×2, Wi-Fi 2.4G, and Wi-Fi 5G hotspots is the same as that previously collected by the terminal device, or signal parameters are within a predetermined range, Wi-Fi 5G is recommended to the terminal device for connection.

In some embodiments, the terminal device may store information such as Wi-Fi information, LTE information, and NR information collected indoors, or the information may be stored on a cloud or a server.

In some embodiments, when it is detected that the terminal device moves to the dining room from the bedroom, the terminal device connects to a Wi-Fi 5G network. Similarly, when it is detected that the terminal device moves to the bathroom from the dining room, the terminal device preferentially connects to an LTE 4×4 network.

Figure 8:
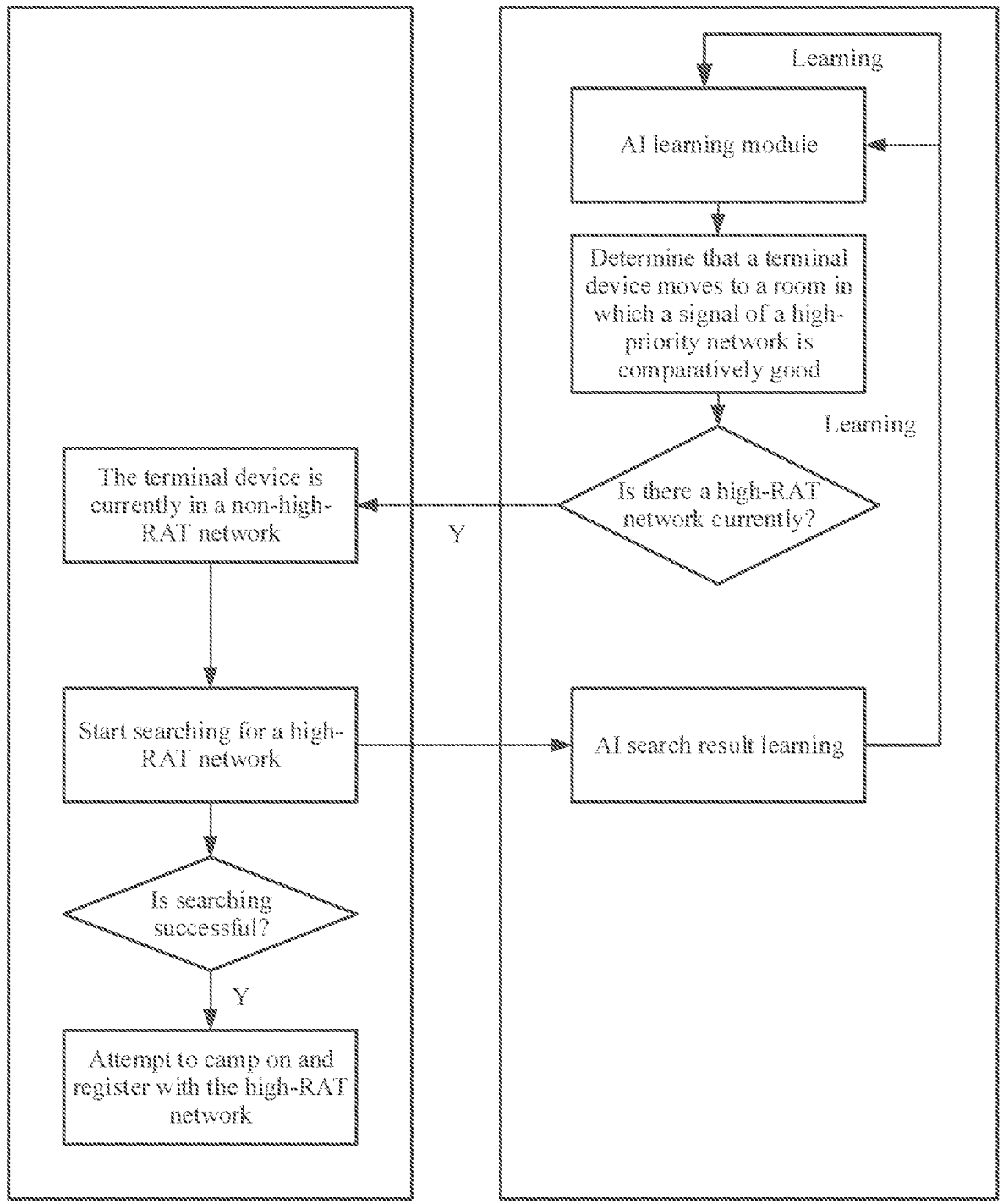
FIG. 8 is a sixth schematic diagram of triggering searching for a high-priority network according to a possible implementation of this application.

A specific implementation procedure is shown in FIG. 8.

An AI learning module may establish a signal fingerprint database of a location by collecting a signal of the location, and may record a highest-RAT network of the location, and set the highest-RAT network to be of a highest priority. In a possible design, signal fingerprint database information may also be extended to information about various access points. An access point with a comparatively good signal is recommended to the terminal device for connection.

When the mobile terminal moves to a location B from a location A, the mobile terminal compares information about an obtained signal with fingerprint database information, and determines a recommended network, that is, a high-priority network, of the current location B. When the terminal device is in a non-high-RAT network, the terminal device starts searching for a high-RAT network.

In a possible design, the AI module may also store and record a result of each background search.

Indoor coverage information of signals such as cellular, Wi-Fi, and BT signals is collected by using an intelligent terminal, signal fingerprints are clustered into a virtual space through intelligent learning, and a signal strength, signal quality, and an application smoothness degree of each space during ordinary use of the terminal (a collection phase) are accumulated. Subsequently (during an identification phase), after entering a space, the terminal can determine, based on historical statistics about a signal strength, signal quality, and an application smoothness degree, whether the space is covered by a high-RAT network. In this way, the terminal can quickly camp on a high-RAT network without searching for a high-RAT or fullband network.

Figure 9:
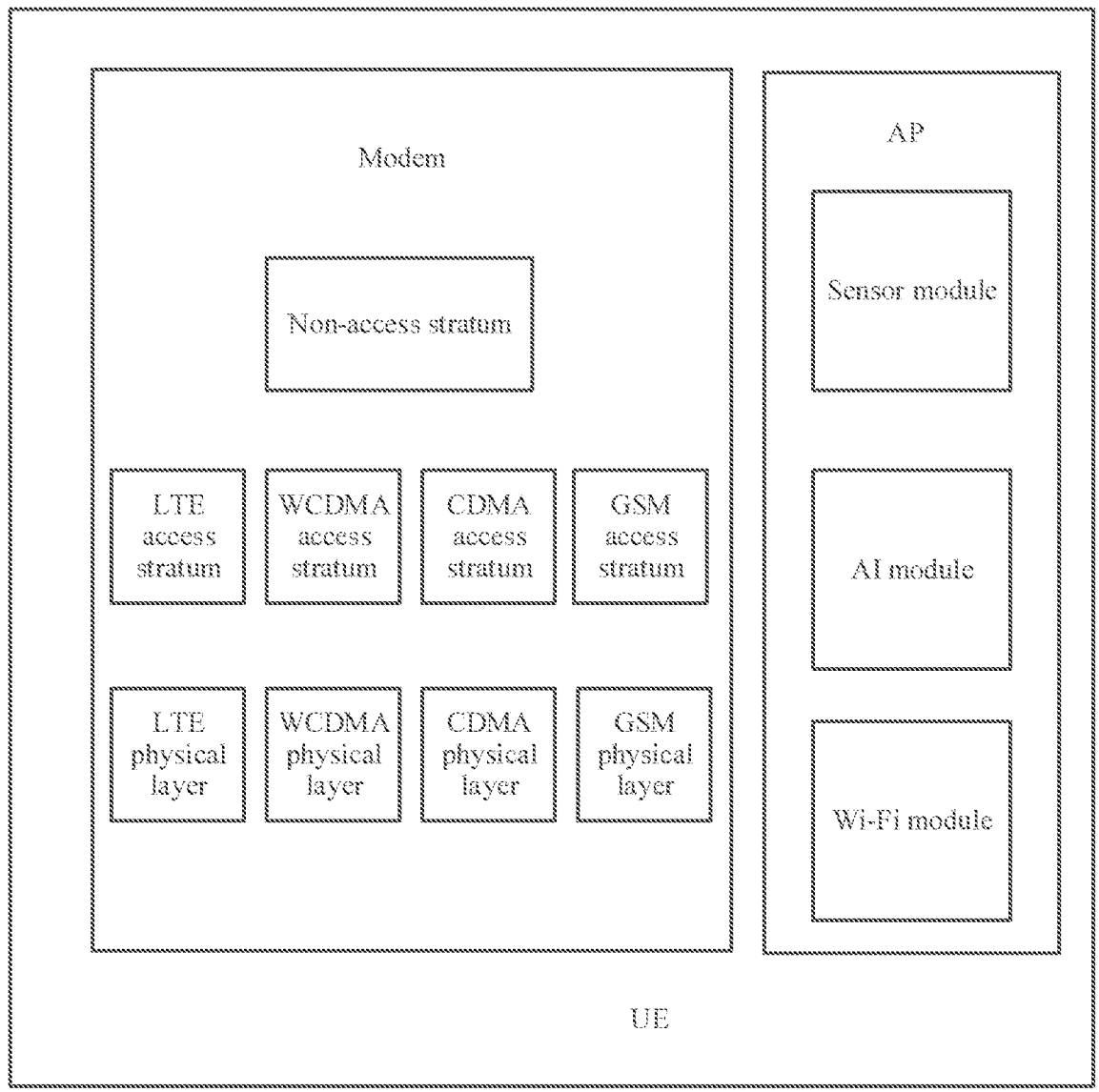
FIG. 9 is a schematic diagram of a terminal device according to a possible implementation of this application.
Figure 10:
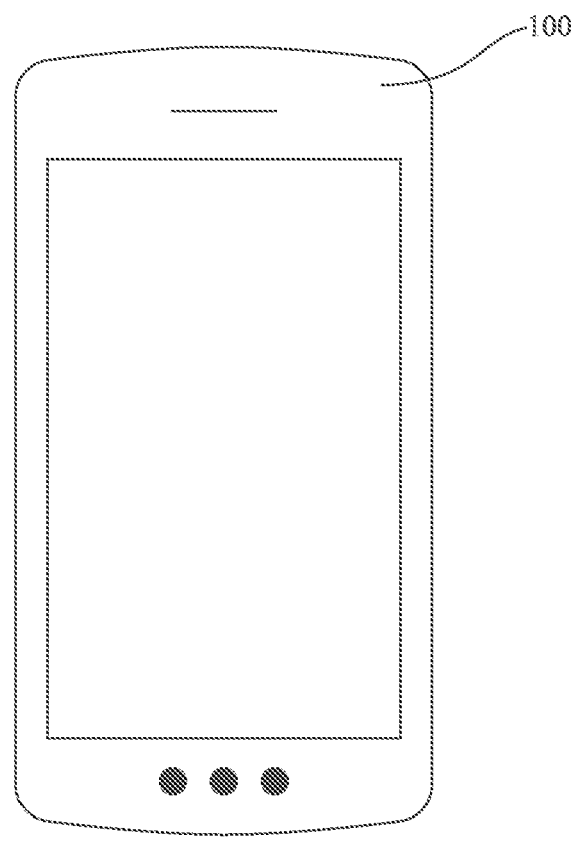
FIG. 10 is a first schematic diagram of a terminal device according to a possible implementation of this application.

FIG. 9 is a schematic diagram of a terminal device according to a possible implementation of this application.

As shown in FIG. 9, an AP needs to include a sensor module (integrating modules such as a barometer and an accelerometer), AI (configured to integrate a machine learning algorithm), and a Wi-Fi module; a modem implements a communications protocol of the terminal device, and provides functions such as searching for a network, camping, registration, and service initiation.

To enable interworking of wireless communication between the terminal device and a base station (for example, an eNodeB), each of the terminal device and the base station may be logically divided, based on an OSI (Open System Interconnection Reference Model) framework, into three protocol layers: a physical layer (namely, a PHY layer), a data link layer (namely, a DLC layer), an application layer, and a non-access stratum. The physical layer is mainly used to provide a wireless physical channel for transmission of a higher layer service, and this layer is mainly implemented by the network-side base station. The non-access stratum (Non-Access Stratum, NAS) serves as a function layer between a core network and the terminal device. The non-access stratum is relative to an access stratum. Protocol layers below an RRC layer may be collectively referred to as the access stratum. Signaling of the access stratum paves the way for signaling interaction of the non-access stratum. The non-access stratum supports signaling and data transmission between the core network and the terminal device, and mainly includes authentication and security control functions. The application layer is mainly used to directly connect to an application program, and provide a common network application service.

The data link layer may be further divided into three sublayers: a media access control layer, or "MAC layer" for short, which mainly provides an interface between a radio link control layer and the physical layer; the radio link control (Radio Link Control) layer, or "RLC layer" for short, which mainly provides segmentation and retransmission services for the terminal device and control data; and a packet data convergence protocol (Packet Data Converge Protocol) layer, or "PDCP layer" for short, which is mainly used to process a radio resource control message on a control plane and an Internet protocol packet on a user plane. The application layer mainly refers to the radio resource control (Radio Resource Control) layer, hereinafter referred to as "RRC layer" for short. A main function of the RRC layer is to allocate a radio resource and send related signaling. A main part of control signaling between the terminal device and a UTRAN (UMTS Terrestrial Radio Access Network) is an RRC message. The RRC message carries all parameters required for establishment, modification, and release of MAC layer and physical layer protocol entities, and also carries some signaling of the non-access stratum.

On condition that indoor signal coverage is comparatively stable, the AI module identifies a virtual space through intelligent learning based on a signal fingerprint collected by the terminal. In this way, searching for a high-RAT network can be quickly triggered when the terminal moves to a place with a high-RAT network of comparatively good quality. This improves user experience.

A terminal device 100 in the embodiments of this application may be a terminal device, a tablet computer, a PDA (Personal Digital Assistant, personal digital assistant), a POS (Point of Sales, point of sale), a vehicle-mounted computer, a TV, a wearable device, an AR device, a VR device, or the like.

Figure 11:
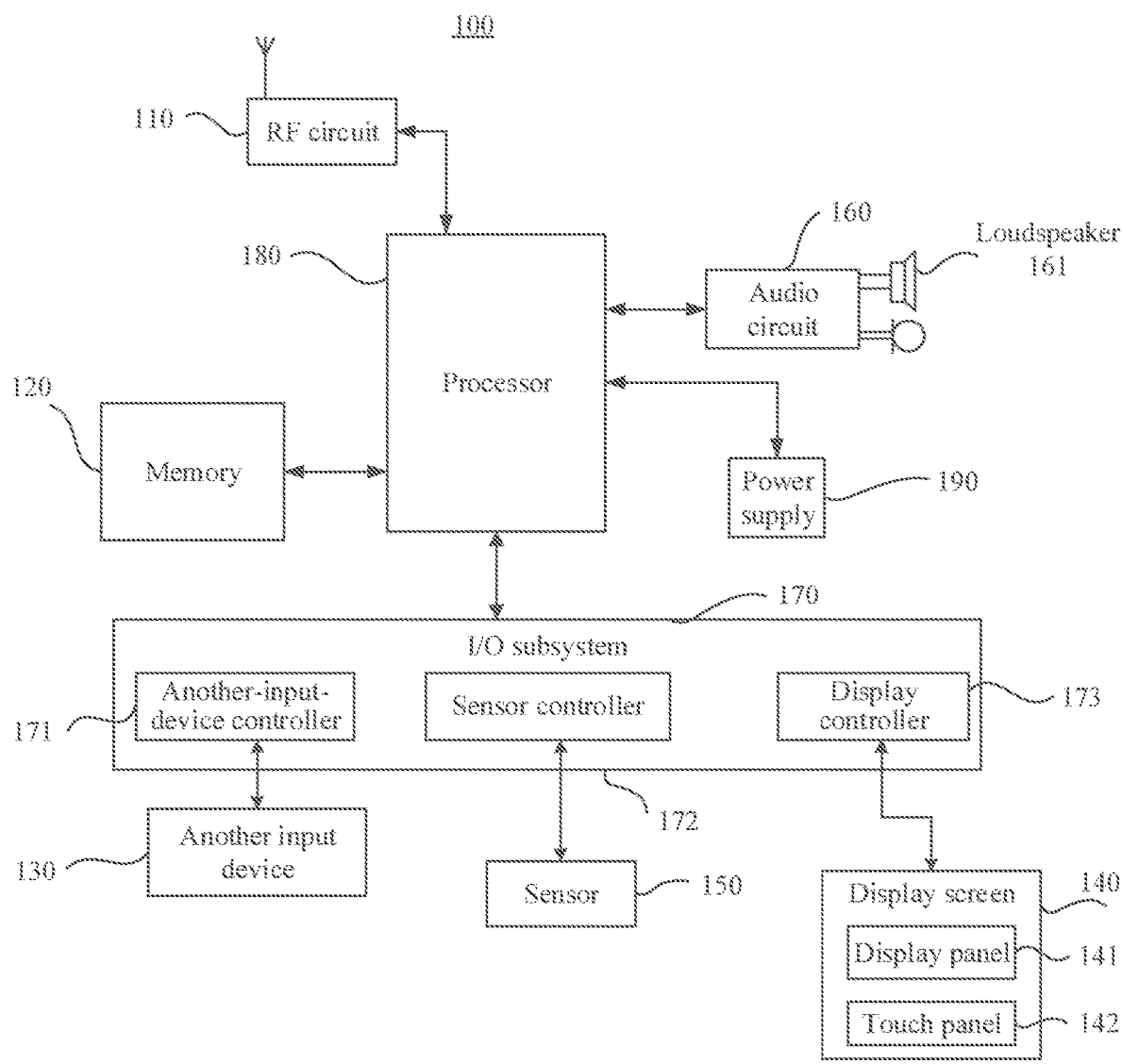
FIG. 11 is a second schematic diagram of a terminal device according to a possible implementation of this application.

For example, the terminal device 100 is a mobile phone. FIG. 11 is a block diagram of a partial structure of the terminal device 100 related to the embodiments of this application. Referring to FIG. 11, the terminal device 100 includes components such as an RF (Radio Frequency, radio frequency) circuit 110, a memory 120, another input device 130, a display screen 140, a sensor 150, an audio circuit 160, an I/O subsystem 170, a processor 180, and a power supply 190. A person skilled in the art may understand that the terminal device structure shown in FIG. 11 does not constitute a limitation on the terminal device, and the terminal device may include more or fewer components than those shown in the figure, or combine some components, or split some components, or have a different component arrangement. A person skilled in the art may understand that the display screen 140 belongs to a user interface (UI, User Interface), and the terminal device 100 may include more or fewer user interfaces than those shown in the figures.

The following specifically describes each constituent part of the terminal device 100 with reference to FIG. 11.

The RF circuit 110 may be configured to receive and send information, or receive and send signals in a call process, and in particular, receive downlink information from a base station and then send the downlink information to the processor 180 for processing. In addition, the RF circuit 110 sends uplink data to the base station. Usually, the RF circuit includes but is not limited to an antenna, at least one amplifier, a transceiver, a coupler, an LNA (Low Noise Amplifier, low noise amplifier), a duplexer, and the like. In addition, the RF circuit 110 may further communicate with a network and another device through wireless communication. The wireless communication may be performed by using any communications standard or protocol, including but not limited to GSM (Global System of Mobile communication, global system for mobile communications), GPRS (General Packet Radio Service, general packet radio service), CDMA (Code Division Multiple Access, code division multiple access), WCDMA (Wideband Code Division Multiple Access, wideband code division multiple access), LTE (Long Term Evolution, long term evolution), email, SMS (Short Messaging Service, short message service), and the like.

The memory 120 may be configured to store a software program and module. The processor 180 performs various function applications and data processing of the terminal device 100 by running the software program and module stored in the memory 120. The memory 120 may mainly include a program storage area and a data storage area. The program storage area may store an operating system, an application program required by at least one function (for example, a sound playback function and an image playback function), and the like. The data storage area may store data (for example, audio data or a phone book) and the like created based on use of the terminal device 100. In addition, the memory 120 may include a high-speed random access memory, and may further include a non-volatile memory, for example, at least one magnetic disk storage device, a flash memory device, or another non-volatile solid-state storage device.

The another input device 130 may be configured to receive digital or character information that is entered, and generate key signal input related to user setting and function control of the terminal device 100. Specifically, the another input device 130 may include but is not limited to one or more of a physical keyboard, a function key (for example, a volume control key or an on/off key), a trackball, a mouse, a joystick, and an optical mouse (the optical mouse is a touch-sensitive surface that does not display a visual output, or is an extension of a touch-sensitive surface formed by a touchscreen). The another input device 130 is connected to an another-input-device controller 171 of the I/O subsystem 170, and performs signal interaction with the processor 180 under control of the another-device-input controller 171.

The display screen 140 may be configured to display information entered by a user or information provided for a user, and various menus of the terminal device 100, and may further receive user input. Specifically, the display screen 140 may include a display panel 141 and a touch panel 142. The display panel 141 may be configured in a form of an LCD (Liquid Crystal Display, liquid crystal display), an OLED (Organic Light-Emitting Diode, organic light-emitting diode), or the like. The touch panel 142, also referred to as a touchscreen, a touch-sensitive screen, or the like, may collect a contact or non-contact operation performed by the user on or near the touch panel 142 (for example, an operation performed by the user on the touch panel 142 or near the touch panel 142 by using any suitable object or accessory such as a finger or stylus, also including a motion sensing operation, where the operation includes operation types such as a single-point control operation and a multi-point control operation), and drive a corresponding connection apparatus according to a preset program. Optionally, the touch panel 142 may include two parts: a touch detection apparatus and a touch controller. The touch detection apparatus detects a touch position and posture of the user, detects a signal brought by a touch operation, and transmits the signal to the touch controller. The touch controller receives touch information from the touch detection apparatus, converts the touch information into information that can be processed by the processor, sends the information obtained through conversion to the processor 180, and can receive and execute a command sent by the processor 180. In addition, the touch panel 142 may be implemented in a plurality of types, such as a resistive type, a capacitive type, an infrared type, and a surface acoustic wave type, or the touch panel 142 may be implemented by using any technology developed in the future. Further, the touch panel 142 may cover the display panel 141. The user may perform an operation on or near the touch panel 142 that covers the display panel 141, based on content displayed on the display panel 141 (the displayed content includes but is not limited to a soft keyboard, a virtual mouse, a virtual key, an icon, and the like). After detecting a touch operation on or near the touch panel 142, the touch panel 142 transmits the touch operation to the processor 180 by using the I/O subsystem 170, to determine a touch event type to determine user input. Then, the processor 180 provides a corresponding visual output on the display panel 141 based on the touch event type by using the I/O subsystem 170. In FIG. 11, the touch panel 142 and the display panel 141 are used as two independent components to implement input and onput functions of the terminal device 100. However, in some embodiments, the touch panel 142 and the display panel 141 may be integrated to implement input and output functions of the terminal device 100.

The terminal device 100 may further include at least one sensor 150, for example, a light sensor, a motion sensor, and another sensor. Specifically, the light sensor may include an ambient light sensor and a proximity sensor. The ambient light sensor may adjust luminance of the display panel 141 based on brightness of ambient light, and the proximity sensor may turn off the display panel 141 and/or a backlight when the terminal device 100 moves to an ear. As a type of motion sensor, an accelerometer sensor may detect magnitudes of acceleration in various directions (generally on three axes), may detect a magnitude and direction of gravity in a static state, and may be used for an application identifying a posture of the terminal device (such as switching between landscape orientation and portrait orientation, a related game, and magnetometer posture calibration) and a function related to vibration identification (such as a pedometer and knocking). For other sensors such as a gyroscope, a barometer, a hygrometer, a thermometer, and an infrared sensor that may be further configured for the terminal device 100, details are not described herein.

The audio circuit 160, a loudspeaker 161, and a microphone 162 may provide an audio interface between the user and the terminal device 100. The audio circuit 160 may transmit, to the loudspeaker 161, a signal converted from received audio data, and the loudspeaker 161 converts the signal into a sound signal for outputting. In addition, the microphone 162 converts a collected sound signal into a signal, and the audio circuit 160 receives the signal, converts the signal into audio data, and then outputs the audio data to the RF circuit 108 to send the audio data to, for example, another terminal device, or outputs the audio data to the memory 120 for further processing.

The I/O subsystem 170 is configured to control a peripheral input/output device, and may include the another-device-input controller 171, a sensor controller 172, and a display controller 173. Optionally, one or more another-input-control-device controllers 171 receive a signal from the another input device 130 and/or send a signal to the another input device 130. The another input device 130 may include a physical button (a press button, a rocker button, or the like), a dial, a slider switch, a joystick, a click scroll wheel, and an optical mouse (the optical mouse is a touch-sensitive surface that does not display a visual output, or is an extension of a touch-sensitive surface formed by a touchscreen). It should be noted that the another-input-control-device controller 171 may be connected to any one or more of the foregoing devices. The display controller 173 in the I/O subsystem 170 receives a signal from the display screen 140 and/or sends a signal to the display screen 140. After the display screen 140 detects user input, the display controller 173 converts the detected user input into interaction with a user interface object displayed on the display screen 140, that is, implements man-machine interaction. The sensor controller 172 may receive a signal from one or more sensors 150 and/or send a signal to the one or more sensors 150.

The processor 180 is a control center of the terminal device 100, is connected to all parts of the entire terminal device by using various interfaces and lines, and executes various functions and data processing of the terminal device 100 by running or executing the software program and/or module stored in the memory 120 and by invoking data stored in the memory 120, so as to perform overall monitoring on the terminal device. Optionally, the processor 180 may include one or more processing units. Preferably, an application processor and a modem processor may be integrated into the processor 180. The application processor mainly performs processing of an operating system, a user interface, an application program, and the like. The modem processor mainly performs processing of wireless communication. It may be understood that, alternatively, the modem processor may not be integrated into the processor 180.

The terminal device 100 further includes the power supply 190 (for example, a battery) that supplies power to each component. Preferably, the power supply may be logically connected to the processor 180 by using a power management system, to implement functions such as charging management, discharging management, and power consumption management by using the power management system.

In some embodiments, whether the terminal device is currently in an elevator mode may be detected by using a sensor such as a barometer or gyroscope of the terminal device, so as to trigger a modem or an AP to search for a high-priority network.

In some embodiments, the processor 180 may include an AI module or an embedded neural-network processor (neural-network process units, NPU), and may be configured to record all records of each search for a high-priority network.

The technical solutions in the embodiments of this application may be applied to various communications systems, for example, a global system for mobile communications (Global System of Mobile Communication, GSM) system, a code division multiple access (Code Division Multiple Access, CDMA) system, a wideband code division multiple access (Wideband Code Division Multiple Access, WCDMA) system, a general packet radio service (General Packet Radio Service, GPRS) system, a long term evolution (Long Term Evolution, LTE) system, an LTE frequency division duplex (Frequency Division Duplex, FDD) system, an LTE time division duplex (Time Division Duplex, TDD) system, a universal mobile telecommunications system (Universal Mobile Telecommunications System, UMTS), a worldwide interoperability for microwave access (Worldwide Interoperability for Microwave Access, WiMAX) communications system, a future $5^{th}$ generation ($5^{th}$ Generation, 5G) system, and a new radio (New Radio, NR) system.

Implementations of this application may be randomly combined to achieve different technical effects.

From descriptions of the foregoing implementations, a person skilled in the art may clearly understand that this application may be implemented by using hardware, firmware, or a combination thereof. When this application is implemented by using software, the foregoing functions may be stored in a computer-readable medium, or transmitted as one or more instructions or code in a computer-readable medium. The computer-readable medium includes a computer storage medium and a communications medium. The communications medium includes any medium that facilitates transfer of a computer program from one place to another. The storage medium may be any available medium accessible to a computer. By way of example rather than limitation, the computer-readable medium may include a RAM, a ROM, an EEPROM, a CD-ROM or another compact disc storage, a magnetic disk storage medium or another magnetic storage device, or any other medium that can carry or store expected program code in a form of an instruction or a data structure and that can be accessed by a computer. In addition, any connection may be appropriately defined as a computer-readable medium. For example, if software is transmitted from a website, a server, or another remote source by using a coaxial cable, an optical fiber or cable, a twisted pair, a digital subscriber line (DSL), or a wireless technology such as infrared, radio, or microwave, the coaxial cable, the optical fiber or cable, the twisted pair, the DSL, or the wireless technology such as infrared, radio, or microwave is included in a definition of a belonged-to medium. A disk (disk) and a disc (disc) used in this application include a compact disc (CD), a laser disc, an optical disc, a digital versatile disc (DVD), a floppy disk, and a Blu-ray disc. The disk usually magnetically copies data, and the disc optically copies data by using laser. The foregoing combination should also be included in the protection scope of the computer-readable medium.

To sum up, the foregoing descriptions are merely embodiments of the technical solutions in this application, but are not intended to limit the protection scope of this application. Any modification, equivalent replacement, improvement, and the like made according to the disclosure of this application shall fall within the protection scope of this application.

What is claimed is:

1. A method implemented by a terminal device, wherein the method comprises:
    connecting to a first hotspot;
    performing a data service through the first hotspot;
    storing a high-priority network list that comprises priorities;
    storing a first maximum number of searches;
    starting searching for, in a descending order of the priorities, a high-priority network when the terminal device disconnects from the first hotspot; and
    pausing or suspending searching for the high-priority network when the searching reaches the first maximum number of searches.

2. The method of claim 1, further comprising disconnecting from the first hotspot when the terminal device leaves an area covered by a signal of the first hotspot.

3. The method of claim 1, further comprising further connecting to the first hotspot using WI-FI.

4. The method of claim 1, wherein the high-priority network comprises a highest-radio access technology (RAT) network supported by the terminal device.

5. The method of claim 1, wherein the high-priority network comprises a fourth generation (4G) network.

6. The method of claim 1, further comprising:
    obtaining the high-priority network, wherein the high-priority network is associated with a second hotspot;
    connecting to the second hotspot; and
    camping on the high-priority network.

7. The method of claim 1, wherein the method further comprises:
    disconnecting from the first hotspot;
    skipping starting searching for the high-priority network responsive to the terminal device being disconnected from the first hotspot; and
    storing a search record of searching for the high-priority network based on the terminal device being disconnected from the first hotspot, wherein the search record identifies that the terminal device does not camp on the high-priority network when the terminal device is disconnected from the first hotspot.

8. The method of claim 6, wherein the first hotspot is a first base station or a first WI-FI hotspot, and wherein the second hotspot is a second base station or a second WI-FI hotspot.

9. The method of claim 1, further comprising:
    further connecting to the first hotspot and further performing the data service using the first hotspot when the terminal device is at a first location, wherein the first location is an area that can be covered by a signal of the first hotspot; and
    further starting searching for the high-priority network when the terminal device is disconnected from the first hotspot and when the terminal device is at a second location, wherein the second location is an area that cannot be covered by the signal of the first hotspot or an area in which a signal strength of the first hotspot is less than a threshold.

10. The method of claim 9, further comprising storing first network parameters of the first hotspot and second network parameters of a second hotspot, wherein the first network parameters and the second network parameters comprise a strength, a signal quality, a registration success rate, and a packet loss rate.

11. A terminal device, comprising:
a memory configured to store instructions; and
a processor coupled to the memory, wherein the instructions, when executed by the processor, cause the terminal device to be configured to:
connect to a first hotspot;
perform a data service through the first hotspot;
store a high-priority network list that comprises priorities;
store a first maximum number of searches;
start searching for, in a descending order of the priorities, a high-priority network when the terminal device disconnects from the first hotspot; and
pause or suspend searching for the high-priority network when the searching reaches the first maximum number of searches.

12. The terminal device of claim 11, wherein the instructions further cause the terminal device to be configured to disconnect from the first hotspot when:
the terminal device leaves an area covered by a signal of the first hotspot; or
the terminal device determines that a signal strength of the first hotspot is less than a threshold.

13. The terminal device of claim 11, wherein the instructions further cause the terminal device to be configured to further connect to the first hotspot using WI-FI.

14. The terminal device of claim 11, wherein the instructions further cause the terminal device to be configured to:
obtain the high-priority network that is associated with a second hotspot;
connect to the second hotspot; and
camp on the high-priority network.

15. The terminal device of claim 14, wherein the first hotspot is a first base station or a first WI-FI hotspot, and wherein the second hotspot is a second base station or a second WI-FI hotspot.

16. The method of claim 1, further comprising disconnecting from the first hotspot when the terminal device determines that a signal strength of the first hotspot is less than a threshold.

17. The method of claim 1, wherein the high-priority network comprises a preset highest-radio access technology (RAT) network.

18. The method of claim 1, wherein the high-priority network comprises a fifth generation (5G) network.

19. The method of claim 1, further comprising:
disconnecting from the first hotspot;
skipping starting searching for the high-priority network; and
storing a search record of searching for the high-priority network, wherein the search record identifies that a signal strength of the high-priority network is less than a threshold when the terminal device is disconnected from the first hotspot.

20. A computer program product comprising computer-executable instructions stored on a non-transitory computer-readable medium that, when executed by a processor, cause a terminal device to:
connect to a first hotspot;
perform a data service through the first hotspot;
store a high-priority network list that comprises priorities;
store a first maximum number of searches;
start searching for, in a descending order of the priorities, a high-priority network when the terminal device disconnects from the first hotspot; and
pause or suspend searching for the high-priority network when the searching reaches the first maximum number of searches.

* * * * *